JACOB S. SALETZKI
ROY T. PALUSKA
INVENTORS

Feb. 3, 1970   J. S. SALETZKI ET AL   3,492,976
CYLINDER HEAD WATER BAFFLE

Filed Feb. 12, 1968   2 Sheets-Sheet 2

JACOB S. SALETZKI
ROY T. PALUSKA
INVENTORS

BY H. M. Saragovitz
E. J. Kelly, H. Berl
and M. V. Wallace
ATTORNEYS

United States Patent Office 3,492,976
Patented Feb. 3, 1970

3,492,976
CYLINDER HEAD WATER BAFFLE
Jacob S. Saletzki, Peoria, and Roy T. Paluska, Washington, Ill., assignors, by mesne assignments, to the United States of America as represented by the Secretary of the Army
Filed Feb. 12, 1968, Ser. No. 704,665
Int. Cl. F01p 11/20, 3/14, 1/36
U.S. Cl. 123—41.5                                      5 Claims

ABSTRACT OF THE DISCLOSURE

An apparatus consisting of a notched cylinder head baffle running the entire width of the cylinder head between the inlet and exhaust valves, the cast notch being adapted to cause a weak spot in said baffle to produce a predetermined stress point which will sever as sections of the cylinder head expand at different rates upon its initial operation due to uneven heating.

---

In the past, engines of the water-cooled type have used baffling in the cylinder head for water flow direction or distribution. When the baffle is tied into the ports, as the engine becomes heated, there is a tendency to cause cracking of the cylinder head of the engine, the same being the result of cracked ports and inner wall portions of the head believed to be caused from the rapid expansion of the exhaust manifold side of the head as compared to the cooler inlet manifold side of the head.

It has been discovered that the above tendency can be overcome by providing a notched water baffle, the notch extending the entire length of the baffle to cause a weak spot in the baffle so as to effect a predetermined stress point which will sever as sections of the head thermally expand upon its initial operation.

The principal object of the present invention is to provide a new and improved notched cylinder head baffle adapted to cause a weak spot in the baffle to produce a predetermined stress point which fail as sections of the cylinder head expand at different rates upon the initial operation.

A further object of the invention is to provide a new and improved cylinder head baffle running the entire width of the cylinder head between the inlet and exhaust valves.

The above and other objects of the invention will appear more fully from the following more detailed description, and from the drawings, wherein.

Figure 1:
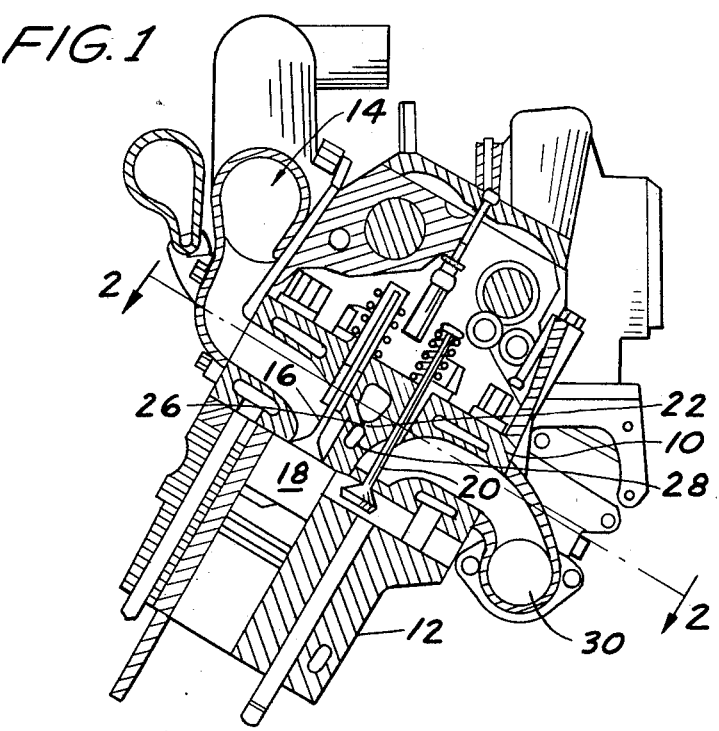
FIGURE 1 is a cross section of an engine showing the notched baffle located between the inlet and exhaust valves.
Figure 2:
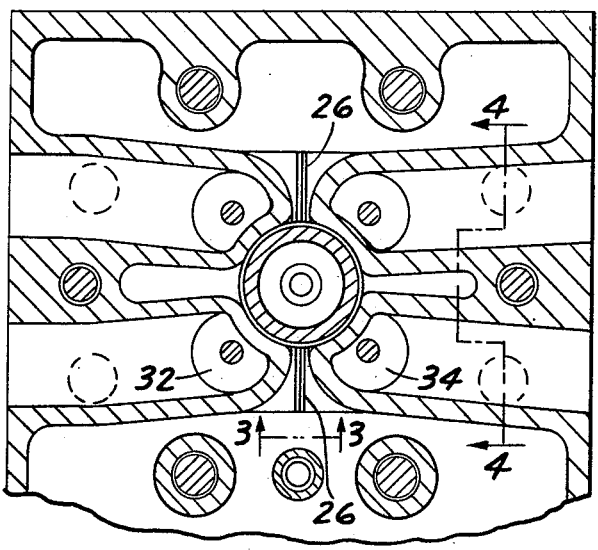
FIGURE 2 is a longitudinal section taken horizontally substantially along line 2—2 of FIGURE 1, through the cylinder head directly above the water baffle.
Figure 3:
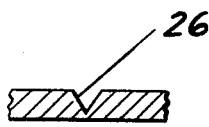
FIGURE 3 is an enlarged view of the notched water baffle, taken substantially along line 3—3 of FIGURE 2.
Figure 4:
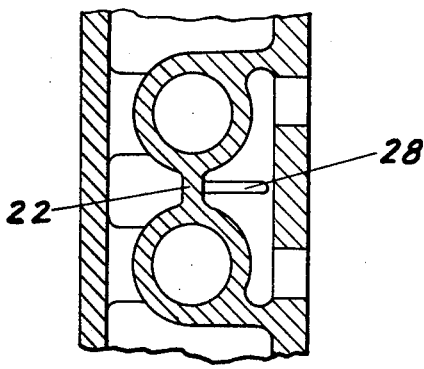
FIGURE 4 is a longitudinal section taken vertically substantially along line 4—4 of FIGURE 2.

Referring now to the drawings, the numeral 10 designates a cylinder head of the type found in internal combustion engines the same being mounted on a motor block 12. Numeral 14 designates an intake manifold leading to an intake valve 16 which allows air to pass into a cylinder 18. An exhaust manifold 30 is provided, the same having an exhaust valve 20 disposed therein. Cooling fluid passes through a conduit 28 between the inlet and exhaust ports. Water baffle 22, disposed between the inlet and exhaust ports 32, 34 forms the upper wall of conduit 28 and serves to direct the water flow for better cooling in the region between the inlet and exhaust ports and the precombustion chamber, not shown. Water baffle 22 being disposed as an integral web between the inlet and exhaust chambers is subjected to stresses caused by uneven thermal expansion between these two chambers. These stresses often cause the baffle to develop a crack which eventually propagates to the chamber walls.

It has been discovered that such failures are eliminated without impairment of the flow-directing property of the baffle by forming the baffle with a longitudinal groove or notch 26 through its entire length.

We wish it to be understood that we do not desire to be limited to the exact details of construction shown and described, for obvious modifications will occur to a person skilled in the art.

We claim:
1. A liquid cooled cylinder head assembly mounted on a motor block of an internal combustion engine, including,
   opposed intake and exhaust manifolds,
   opposed intake and exhaust valves,
   a fluid conduit interposed between said intake and exhaust valves in said cylinder head, and
   a notched horizontal water baffle disposed in said conduit parallel to the bottom surface of same.
2. A liquid cooled cylinder head assembly as set forth in claim 1, wherein:
   said notch in said baffle is V-shaped.
3. A liquid cooled cylinder head assembly as set forth in claim 1, wherein:
   said horizontal baffle directs cooling media to the hot regions of said cylinder head and said V-shaped cast notch in said baffle controls the location of metal separation resulting from excessive stress due to variable thermal expansion characteristics.
4. A liquid cooled cylinder head assembly as set forth in claim 1, wherein:
   said notch in said baffle extends the entire width of same.
5. A liquid cooled cylinder head assembly as set forth in claim 1, wherein:
   said notched baffle absorbs the temperature variation between the inlet and exhaust valves.

References Cited

UNITED STATES PATENTS

| 1,106,977 | 8/1914  | Schwarz    | 123—41.5  |
| 1,326,501 | 12/1917 | Hentschke  | 123—41.82 |
| 1,678,349 | 7/1928  | Moore      | 123—41.82 |
| 2,030,894 | 2/1936  | Pennebaker | 123—41.82 |
| 2,525,994 | 10/1950 | Baber      | 123—41.5  |

MARK M. NEWMAN, Primary Examiner

U.S. Cl. X.R.
123—41.77, 41.82